(No Model.) 9 Sheets—Sheet 1.

J. G. POWELL.
MACHINE FOR SEWING LOOPED FABRICS.

No. 589,511. Patented Sept. 7, 1897.

Fig. 1.

Witnesses:
Walter C. Pusey
Jesse B. Heller

Inventor.
John G. Powell,
per Joshua Pusey,
Attorney.

(No Model.) 9 Sheets—Sheet 2.

J. G. POWELL.
MACHINE FOR SEWING LOOPED FABRICS.

No. 589,511. Patented Sept. 7, 1897.

Fig. 2.

Witnesses:
Walter C. Pusey
Jesse B. Heller

Inventor.
John G. Powell,
per Joshua Pusey,
Attorney.

(No Model.)

J. G. POWELL.
MACHINE FOR SEWING LOOPED FABRICS.

No. 589,511.　　　　　　　　Patented Sept. 7, 1897.

Fig. 3.

Witnesses:
Walter C. Pusey
Jesse B. Heller

Inventor.
John G. Powell,
per Joshua Pusey,
Attorney.

(No Model.) 9 Sheets—Sheet 5.

J. G. POWELL.
MACHINE FOR SEWING LOOPED FABRICS.

No. 589,511. Patented Sept. 7, 1897.

Witnesses.
Walter C Pusey.
Jesse B. Heller.

Inventor.
John G Powell,
per Joshua Pusey,
Attorney.

THE NORRIS PETERS CO., PHOTO-LITHO., WASHINGTON, D. C.

(No Model.) 9 Sheets—Sheet 6.

J. G. POWELL.
MACHINE FOR SEWING LOOPED FABRICS.

No. 589,511. Patented Sept. 7, 1897.

Witnesses.
Walter C Pusey.
Jesse B. Heller.

Inventor.
John G. Powell,
per Joshua Pusey,
Attorney.

THE NORRIS PETERS CO., PHOTO-LITHO., WASHINGTON, D. C.

(No Model.) 9 Sheets—Sheet 7.

J. G. POWELL.
MACHINE FOR SEWING LOOPED FABRICS.

No. 589,511. Patented Sept. 7, 1897.

Witnesses.
Walter C Pusey.
Jesse B. Heller.

Inventor.
John G. Powell,
per Joshua Pusey
Attorney.

(No Model.) 9 Sheets—Sheet 8.

J. G. POWELL.
MACHINE FOR SEWING LOOPED FABRICS.

No. 589,511. Patented Sept. 7, 1897.

Witnesses.
Walter C. Pusey.
Jesse B. Heller.

Inventor.
John G. Powell,
per Joshua Pusey,
Attorney.

(No Model.)  9 Sheets—Sheet 9.

J. G. POWELL.
MACHINE FOR SEWING LOOPED FABRICS.

No. 589,511. Patented Sept. 7, 1897.

Fig. 18.

Witnesses.
Walter C. Pusey.
Jesse B. Heller.

Inventor.
John G. Powell,
per Joshua Pusey,
Attorney.

UNITED STATES PATENT OFFICE.

JOHN G. POWELL, OF PHILADELPHIA, PENNSYLVANIA, ASSIGNOR TO HIMSELF AND EDWARD POWELL, OF SAME PLACE.

MACHINE FOR SEWING LOOPED FABRICS.

SPECIFICATION forming part of Letters Patent No. 589,511, dated September 7, 1897.

Application filed September 11, 1894. Serial No. 522,692. (No model.)

*To all whom it may concern:*

Be it known that I, JOHN G. POWELL, a citizen of the United States, residing in the city and county of Philadelphia and State of Pennsylvania, have invented certain new and useful Improvements in Machines for Uniting Looped Fabrics, of which the following is a full, clear, and exact description, reference being had to the accompanying drawings, in which—

Fig. 3, Sheet 3, a front side elevation, the cylinders being removed.

This invention relates to that class of machines for uniting the edges of separate parts of looped or knit fabrics—such, for example, as the tops and legs of stockings—wherein a vibrating thread-carrying needle, in connection with stitch-forming mechanism, unites the loops of contiguous edges of the two parts of the fabrics impaled upon the points of a rotatable cylinder.

The main object of this invention is to provide mechanism for the purpose of uniting such parts of looped or knit fabrics by a peculiar elastic loop stitch or connection of the character hereinafter described, although not claimed in this application.

Broadly considered, the invention consists, essentially, in the combination of a series of impaling-points secured to a common bed or support and upon which the end loops of the fabrics or parts to be united may be impaled in the usual manner, means for imparting to said support a step-by-step movement, a vibrating needle carrying the looping-thread and arranged to pass through the impaled end loops of the fabrics and also to make an intermediate vibration between each two adjacent impaling-points, means, including a looper, coöperating with said needle to form a stitch upon each vibration thereof, and means independent of the needle and looper and operating intermittently to engage and hold distended certain of the loops formed by said needle and looper, whereby the stitches formed intermediately of the impaling-points are formed with slack or spare thread and the stitches through the loops are made tight, or whereby two kinds of stitches are formed alternately, one a tight stitch embracing the contiguous loops of the fabrics to be united and the other a loose stitch made between and connecting the tight stitches.

The invention also consists in the novel construction and combination of parts, all as hereinafter described, and pointed out in the appended claims.

Referring to the annexed drawings, which illustrate the preferred form of the invention, A is the frame or bed of the machine, upon which the looping mechanism is mounted.

B is the main shaft, which may be conveniently driven by a handle $a$, or, as usually, from a source of power by a belt passing over a tight pulley $b'$ on the end of said shaft. This shaft turns in suitable bearings $b^2$ in the direction of the arrow upon the said pulley, and by its rotation the required movements are imparted to the various mechanisms which coöperate to produce the final result or purpose of the machine.

Figure 1:
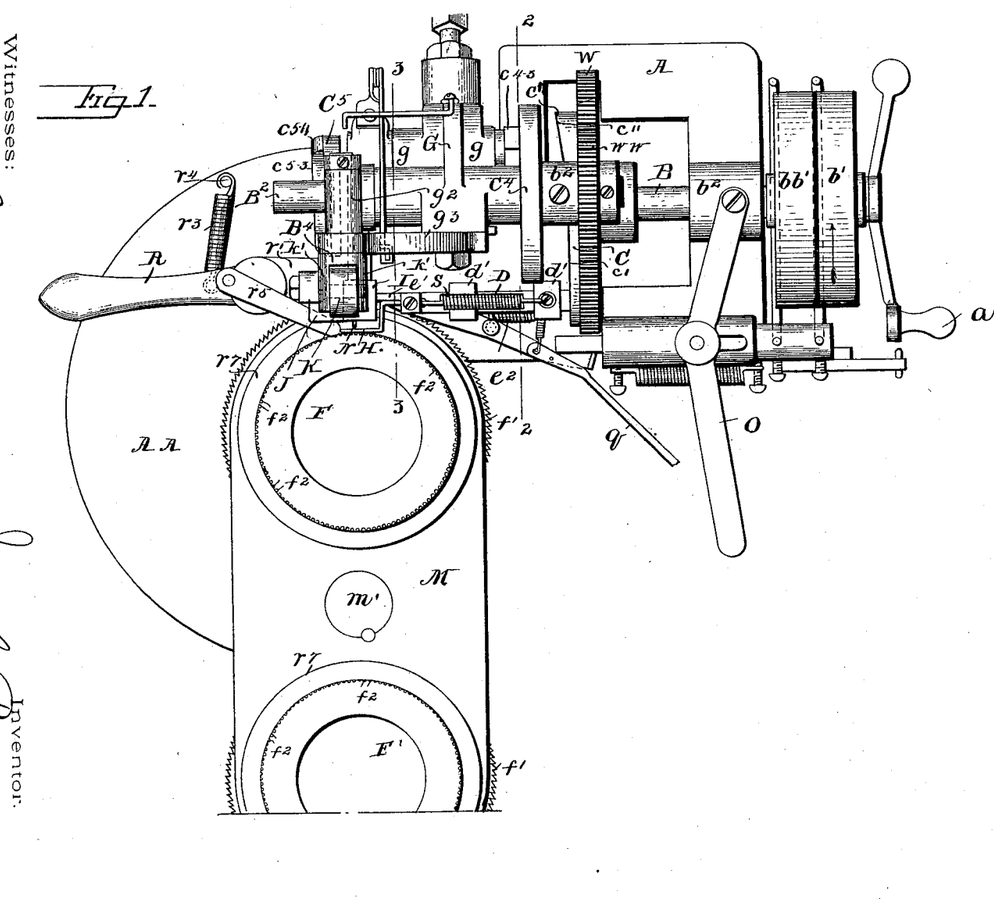
Figure 1, Sheet 1, is a plan view.
Figures 9, 19, 20:
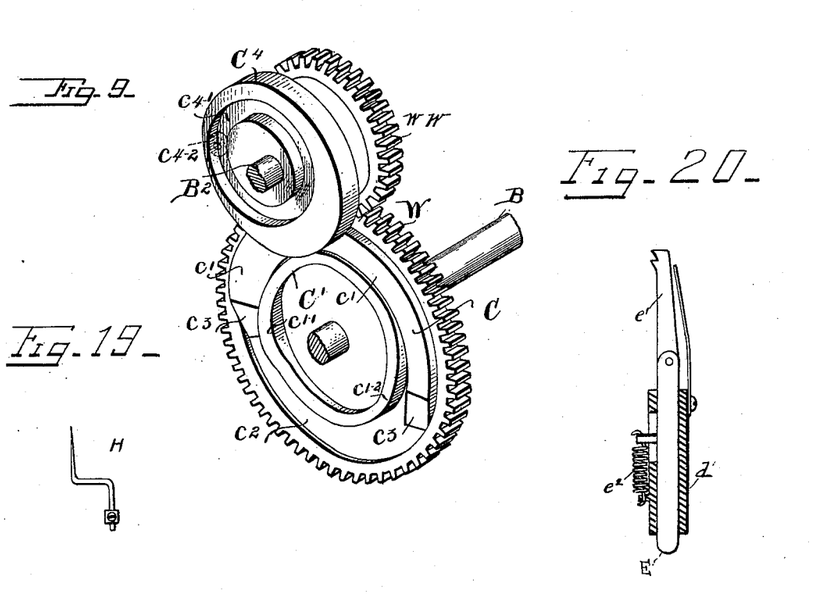
Fig. 9, Sheet 7, a perspective view of gears and contiguous cams.
Fig. 19 is a detail view of the horn.
Fig. 20 is a detail view of the pawl-carrier and the pawl which operates the cylinders.

W is a toothed spur-wheel on the shaft B. On the inner face of this wheel are two cam devices C C', both concentric with the said shaft. These cams are seen more clearly in Figs. 1, 4, 5, and 6, and distinctly in perspective in Fig. 9, Sheet 7. The function of the outer one, C, is to advance at certain intervals an L-shaped horizontal bar D, Figs. 1, 3, 5, and 6, whose rear end bears against said cam, as seen in Figs. 1 and 3, and which carries on its vertical limb the horn H, Figs. 1, 2, 3, and 6, as also Figs. 11 to 15, Sheet 8, over which the loops of the needle-thread are drawn at certain intervals, as hereinafter described, and to permit the retraction of the horn at predetermined times by the stress of a spring S, the rear end of which spring is fixed to a guide-frame $d'$, in which said bar slides, and its forward end is attached to the bar. This cam device C consists of an annulus having a projecting or elevated portion $c'$, occupying about one-half of the annulus and a cut-away or depressed part $c^2$, with inclines $c^3$, leading from one to the other portion at each extremity. The other cam device C' consists of an annulus with two about equidistant rising and falling inclines or cam-surfaces, one of which, $c^{11}$, is more elevated than the other, $c^{12}$, and whose function is to actuate a spring ($e^2$) retracted horizontal bar E, sliding in the frame $d'$ beneath the bar D, whose rear end bears against said cam device and whose free forward end carries a pivoted spring-controlled pawl $e'$, that engages the ratchet-teeth of a horizontal disk or wheel $f'$, which is connected with the rotatable hollow cylinder F, provided with the circumferential impaling-points $f^2$. By this mechanism the said cylinder F is caused to rotate a distance equal to about one-half that between two adjacent impaling-points at about each half-revolution of the main shaft, the movement being slightly more than one-half such distance, however, when the bar E is actuated by the higher cam-surface and slightly less than one-half when the actuation of said bar is by the lower incline. In this manner, as will hereinafter more fully appear, and inasmuch as the greater movement of the cylinder immediately precedes the formation of a loose stitch, a greater length of thread is provided for such stitch.

The main or driving shaft B has fixed thereto a third cam or eccentric $C^3$, Figs. 2, 3, 4, and 6, whose purpose is to impart at certain stages a to-and-fro vibratory movement to a pivoted arm G, that carries the vibrating needle-bar I and mechanism for actuating the same, with certain adjuncts, also hereinafter described. A retracting-spring $ss$, Figs. 2 and 6, one end of which is attached to said arm and the other end to a vertical stud on the frame of the machine, serves to always keep the arm in contact with the eccentric.

Arm G is provided with journals pivoted in suitable bearings $g'$ on the frame of the machine. In a cross-head of the arm is journaled a horizontal shaft $B^2$, above the driving-shaft B, which shaft $B^2$ has fixed to one end a pinion-gear $ww$, whose teeth engage those of the spur-wheel W, and whose diameter is one-half that of the latter wheel. Shaft $B^2$ also has fixed thereon a disk $C^4$, with an eccentric groove $c^{41}$ in its inner face, with which groove engages a stud $c^{42}$, on the outer end of an arm $c^{43}$, that is fixed to a shaft $B^3$, journaled in a cross-head $g$ of arm G. The outer end of this shaft $B^3$ carries an arm or bar I, to whose free end the curved thread-needle N is secured. The function of the said eccentric $c^{41}$ and connections is to cause the necessary up-and-down vibrations of the needle in the arc of a circle, as described farther on. Shaft $B^2$ also has fixed on its outer end a peculiarly-shaped cam-wheel $C^5$, (shown detached in Fig. 10, Sheet 7,) which is adapted to impart a compound motion to a bifurcated hook J, as hereinafter described.

Hook J is attached to a vertically-depending arm K, whose upper end is pivoted between the vertical jaws $k'$ of a horizontal transverse shaft $B^4$, which is in turn pivoted in a head $g^2$ of a limb $g^3$, that projects up laterally from and is secured to the vibrating arm G. It will thus be seen that this depending arm is capable of a simultaneous lateral swinging and a to-and-fro movement—that is, in two planes at right angles to each other—and that either or both of these movements may take place during the reciprocation of the arm G by the action of the cam eccentric $C^3$ on the main shaft.

Figure 10:
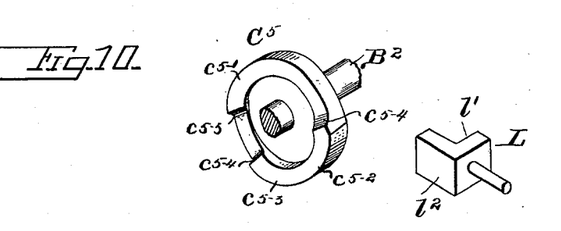
Fig. 10, a perspective view of the hook-actuating cam and of L-shaped lug.

On the rear side of the depending arm K is an L-shaped shoe L, which is shown detached adjacent to the cam-wheel $C^5$ in Fig. 10. This shoe is so arranged that one limb $l'$ thereof bears continually against the edge or periphery of the cam-wheel $C^5$ and the inside of the other or outer limb $l^2$ bears against the lateral surface of said cam-wheel, such bearings being insured by means of a diagonally-disposed spiral spring $S'$, one end of which is attached to said arm K and the other end to the arm G. About one half $c^{51}$ of cam-wheel $C^5$ is plane and semicircular. The other half $c^{52}$ of its edge or periphery is eccentric, and its side face $c^{53}$ is raised or extends beyond and above the face $c^{51}$. Inclines $c^{54}$ lead from one of the side faces to the other, and the face $c^{51}$ is cut or dished in in front of one of said inclines, so as to form a concave notch $c^{55}$, in which is adapted to enter the lateral limb $l^2$ of shoe L at each revolution of the cam-wheel, as hereinafter explained.

F is a hollow cylinder having the vertical impaling-points $f^2$, hereinbefore referred to. It is rotatably mounted on a bed or support M, through which its lower end projects, and has secured thereto the ratchet-wheel $f'$, with whose teeth the end of pawl $e'$ of the sliding bar E is adapted to engage for imparting the required step-by-step rotation of said cylinder, as hereinafter explained in the description of the operation of the machine. The thread-needle N, whose path is adjacent to the periphery of the cylinder, vibrates in a plane that, extended, would pass through the center of the latter.

Figure 16:
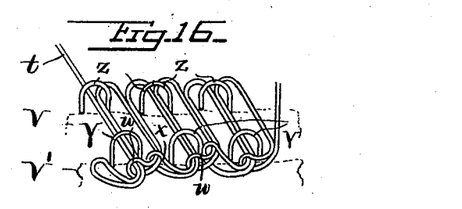
Figs. 16 and 17, illustrations of the looped connection made by the machine.
Figure 17:
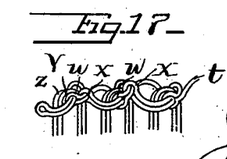
Figure 18:
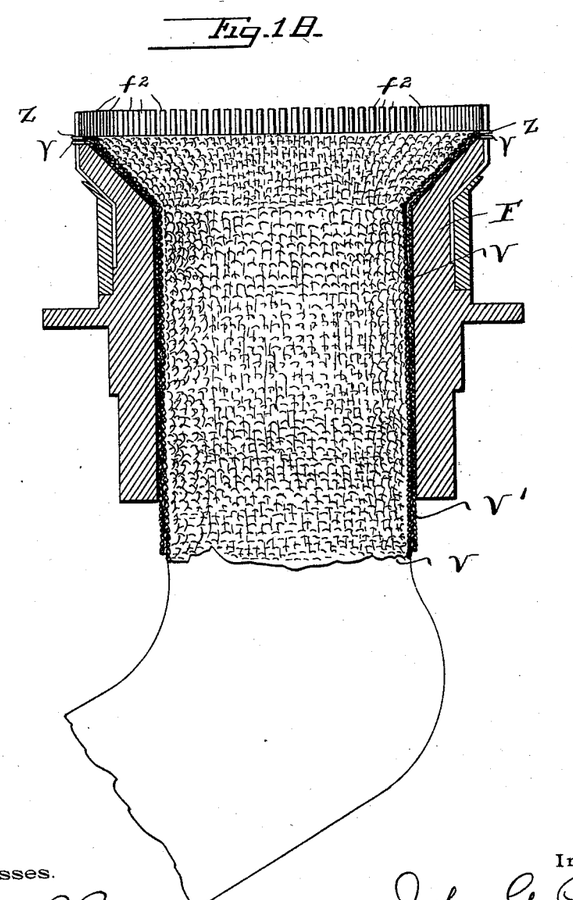
Fig. 18, Sheet 9, a vertical section of cylinder, showing the end loops of the top and leg of a stocking, respectively, upon the impaling-points preparatory to operating the machine.

I have described the mechanism which, or its equivalent, is essential to the production of the main purpose of the invention, which is to unite the series of loops of the two fabrics, such as the leg $v$ of a stocking and the top $v'$, Figs. 16, 17, and 18, superposed upon the impaling-points by means of tight stitches and intermediate loose stitches, whereby a union or seam is made which is extremely elastic.

Figure 11:
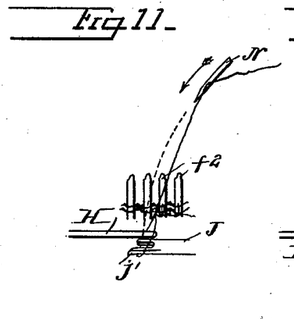
Figs. 11, 12, 13, 14, and 15, Sheet 8, views of positions of the stitch-forming mechanism at different stages.
Figure 12:
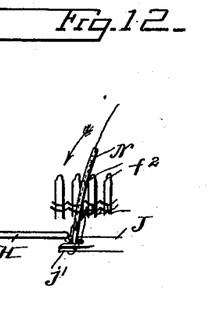
Figure 13:
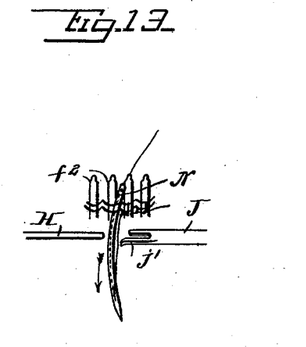
Figure 14:
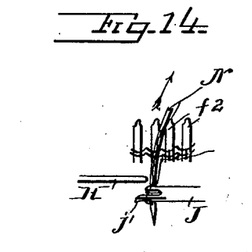
Figure 15:
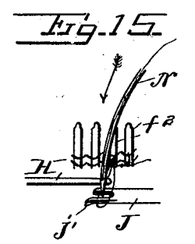

I shall now proceed to describe the operation of the mechanism, premising that the end loops of the leg of a stocking $v$ have been placed in the usual manner on the cylinder impaling-points and also the top $v'$ to be united thereto, as seen in Fig. 18. Now assuming that the needle is at the end of its upward throw when directly opposite one of the impaling-points $f^2$, the relative positions then occupied by the needle N, the looping-thread, the hook, and the horn are shown in Fig. 11, Sheet 8. At this instant the end of the horn-carrying bar D is riding on the elevated part $c'$ of the cam C a short distance in the rear of one of the inclines $c^3$. The end of the pawl-carrying bar E is bearing on the summit of the least rise $c^{1\,2}$ of annulus C'. Eccentric $C^4$ is about at its farthest rearward throw. Eccentric cam $C^3$ is inactive—that is, about in a position ready to retract the arm G and adjuncts. The L-shaped shoe L of the said swinging depending arm K bears upon the circular part $c^{5\,1}$ of the cam $C^5$ about midway thereof. The thread $t$ is looped over the forks of hook J, and horn H is advanced toward the path of the needle, a loop having been made over it, (the horn.) Now as the main shaft further rotates the needle is caused to descend by the action of the eccentric $C^4$ on the arm $c^{4\,3}$ on the shaft $B^3$ of the needle-bar. As it (the needle) descends it passes through the loops of the two fabrics on the immediately opposite impaling-point, thence through the opening-loop on the forks of the hook, which to that end has been moved farther toward the path of the needle by the L-shaped shoe L, passing into the notch $c^{5\,5}$ on the face of the cam-wheel $C^5$. Meanwhile the end of the bar D, sliding down one of the inclines from the elevated part of annulus C by the stress of spring S, retracts the horn and its point escapes from the previously-formed loop, as hereinafter described. The end of bar E, which carries the pawl $e'$, is now riding upon the more elevated plane part of annulus C'. The relative positions of the hook, the horn, the needle, and the thread-loops at this stage are shown in Fig. 12 taken at the instant the point of the needle has reached the forks of hook J. As the main shaft continues to rotate, the needle continuing its downward motion, the outer limb $l^2$ of the L-shaped shoe L passes out of the depression $c^{5\,5}$ and then rides upon the elevated face $c^{5\,3}$, which, moving the pivoted arm K outwardly and (by the action of the eccentric face $c^{5\,2}$) inwardly toward the cylinder, allows the escape of the loop while the needle is within the latter. As the needle further descends to the end of its stroke, Fig. 13, the loop is drawn tightly over the upper part of the needle. At this instant the shoe L is still riding upon the eccentric part $c^{5\,2}$ of the cam-wheel $C^5$, but near the incline $c^{5\,4}$, leading to the plane circular portion of the wheel. As the needle starts on its upward movement the rotation of wheel $C^5$ permits the shoe L to again slide to its plane circular part. The arm K, and consequently the hook J, by the stress of the spring S', moves back from the cylinder and toward the needle, whereby the outer fork $j'$ of the hook passes between the needle and the thread therein and distends the thread, and thus the latter will be looped over the hook, as seen in Fig. 14. As the needle proceeds on its upward throw the end of bar E rides upon the greater rise $c^{11}$ of the annulus C', which advances the bar and its pawl and thus causes cylinder F to rotate a distance equal to one-half or a little greater than one-half that between two adjacent impaling-points. As the needle escapes from the loops on the impaling-point the stitch is drawn taut around the loops. As the needle now again descends the eccentric cam $C^3$ on the main shaft bearing against the inside of the arm G, or, rather, in the present instance, against an adjustable stud projecting therefrom, forces the arm back, and consequently the needle, a short distance, whereby the latter is caused to pass outside the loops on the impaling-points. At a point in this downward movement of the needle the L-shaped shoe L again, so to say, arrives at the depression $c^{5\,5}$ of the cam-wheel $C^5$, thereby allowing hook J to move into position for the needle to pass through the loop upon the hook. Meanwhile the end of bar D, passing from the depressed part of the annulus C, rides upon the elevated face $c'$ thereof, which causes the horn to advance and its point to pass into the loop back of the needle. This advance of the horn takes place a short time before the retraction of the hook, which latter movement occurs shortly before the needle has reached the limit of this second downward stroke to permit the escape of the loop from said hook. The positions of the hook, horn, &c., before the hook is retracted and after the horn has entered the loop are shown in Fig. 15. At this time the needle is about to pass through the loop on the hook which was formed where the parts are in the position shown in Fig. 14. It will be observed that the arrangement of the cams C $C^5$ (the latter making two revolutions while the former makes one) is such that the movement of the hook is the same during both downstrokes of the needle, but that upon that downstroke of the needle in which it passes through the impaled loops the horn is retracted, while upon the succeeding downstroke it is advanced and remains advanced until the next downstroke. Immediately before the needle has reached the extent of the downward throw the plane circular part of the cam-wheel $C^5$ being presented to shoe L, (the horn remaining quiescent within the loop,) the hook J again moves to catch the outer part or limb of the needle-thread on its outer fork and distend it for the passage of the needle when the latter makes its next downward stroke. As the needle rises to the limit of its upstroke—that is, about the position of Fig. 11—the loop previously made over the needle is drawn tightly over the horn. During the latter part of this upstroke the horn and hook are in the position shown in Fig. 11. During this upward stroke the bar E has ridden up upon the higher elevated part $c''$ of the annulus $C'$ and, thereby advancing its pawl, has again rotated the cylinder the second-step distance between the impaling-points—that is, the next impaling-point is brought opposite the needle. At the same time the eccentric-cam $C^3$ has rotated in the position to allow the arm G and the needle to move toward the cylinder in position for the needle to pass through the loops on the impaling-points when it descends. The main shaft of the machine has now made a complete revolution, and the parts will now be in the relative positions occupied at the beginning of the foregoing description of the operation of the mechanism, the needle, &c., being then in the position shown in Fig. 11. All succeeding movements are simply repetitions of those described until the entire course of loops on the impaling-points have been united. The main drawings show the relative positions of the parts at about the time the needle, horn, &c., have reached the positions shown in Fig. 14. It will thus be seen that the stitches formed by the passage of the needle through the loops on the impaling-points are tight stitches, while the intermediate stitches made outside the cylinder and over the horn are slack stitches—that is, in effect the series of tight stitches which unite the two parts of the fabric are successively connected by a continuous intervening slack thread, which permits the fabric to be stretched to the utmost limit without danger of breaking their union. The nature of this connection is illustrated in Figs. 16 and 17, Sheet 8.

In Fig. 16, Y designates the course of end loops of one part of the fabric—say the top $v'$—of the stocking that are impaled upon the cylinder-points, and $z$ the impaled loops of the other part—the leg $v$. I have, in the figure, for perspecuity separated the opposite courses of loops a considerable distance, as also the stitch made with the looping-thread $t$. It will be seen that the doubled thread passes through each opposite pair of the fabric-loops, and a loop $u$ is made contiguous to each of the end loops Y. Also there is a loop $x$ between the several loops $u$. The threads or loops embracing the superposed impaled loops are drawn tightly upon the latter by the machine and the series of loose loops $x$ intervene, as seen in Fig. 17. By means of this peculiar connection I am enabled to secure a tight yet extremely elastic union of the parts of a looped or knit fabric, the extent of possible stretching on the line of the union being limited only by the length of the loops between the tight stitches. Inasmuch as the loose stitches are made at a distance from the cylinder corresponding to the extent of the backward movement of the needle away from the cylinder, said stitches being held by the horn, it will be apparent that these intermediate loops are of correspondingly greater length, which increases the degree of possible stretching on the line of union, while the line of junction of the parts does not show an open space, as is the case when, as heretofore, said parts are connected by a series of loose stitches.

The tension device and means for conducting the thread from the spool to the needle are shown in the drawings, but as these may be of various forms and do not constitute an essential element of my invention I have not deemed it necessary to describe the same. I have also shown a device whereby by the movement of a lever O the driving-belt of the machine may be shifted from the tight pulley $b'$ to the loose pulley $bb'$ in order to stop the machine, and the converse, at the same time throwing the pawl away from the cylinder and holding it out of engagement therewith. I also show a pivoted lever $q$ for throwing the spring-controlled pawl $e'$ out of contact with the teeth $f'$ of the cylinder-wheel when necessary, but as these devices, although convenient, are not essential to the successful operation of the machine I have also not deemed it necessary to describe particularly their construction.

Figure 2:
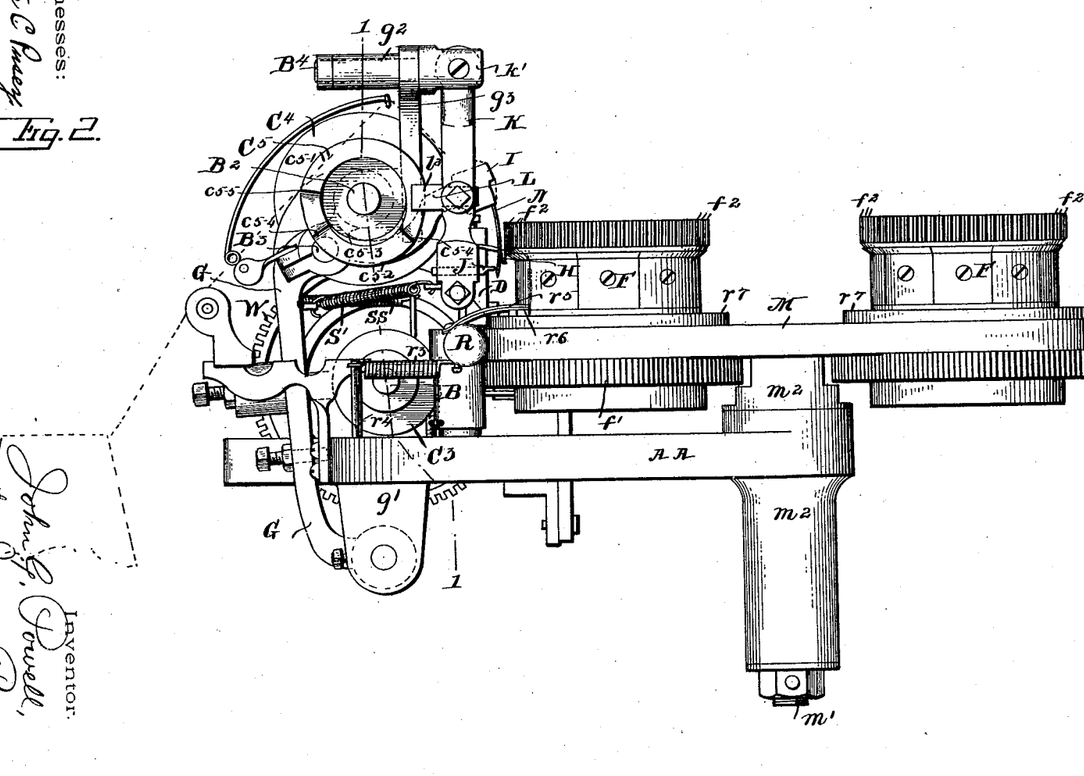
Fig. 2, Sheet 2, an end elevation.
Figure 4:
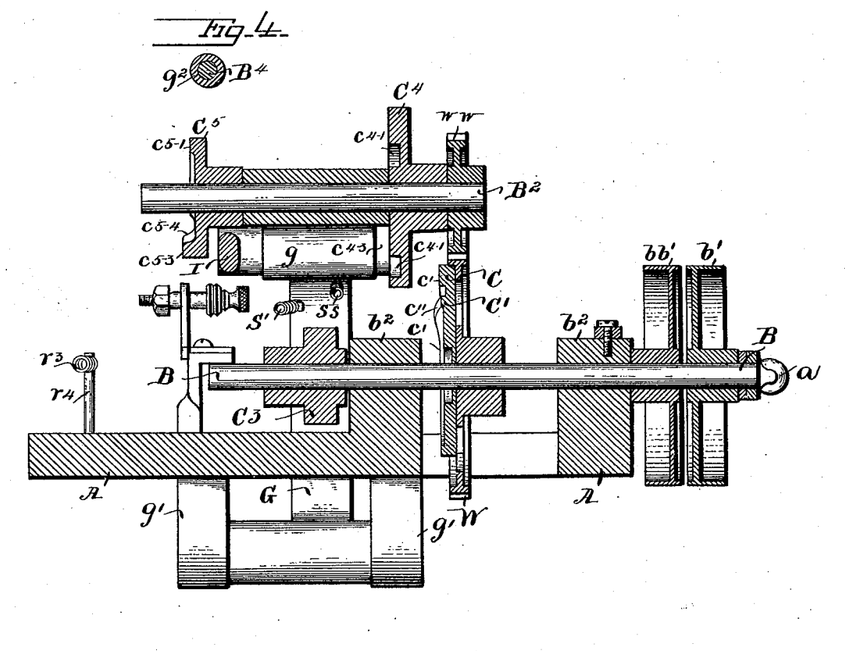
Fig. 4, Sheet 4, a vertical section on line 1 1, Fig. 2.
Figure 5:
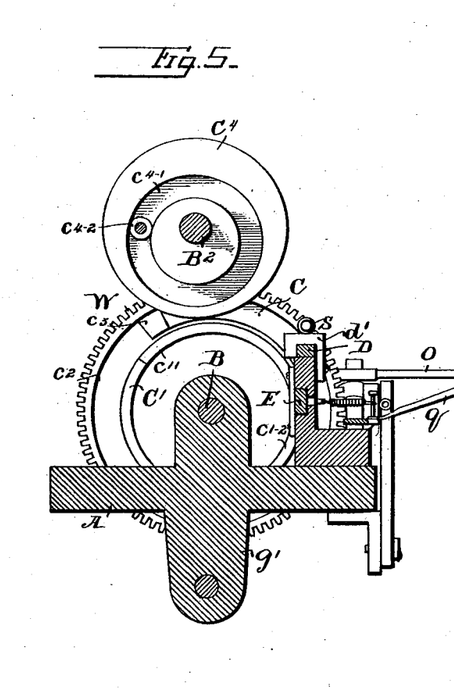
Fig. 5, Sheet 5, a vertical section on line 2 2, Fig. 1.
Figure 6:
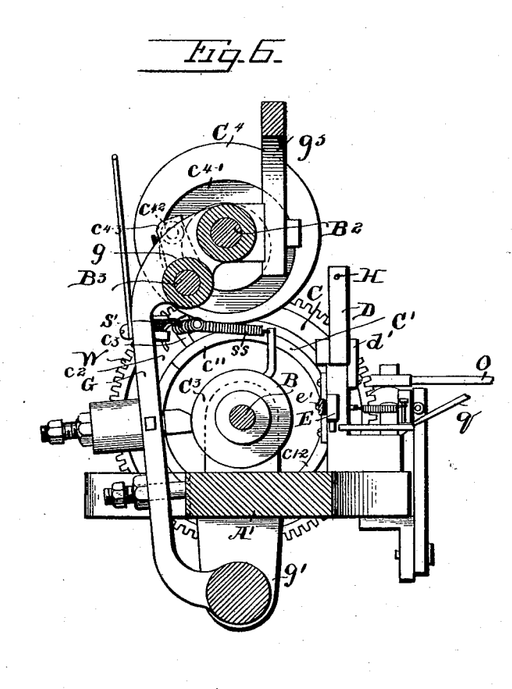
Fig. 6, a vertical section on line 3 3, Fig. 1.
Figure 7:
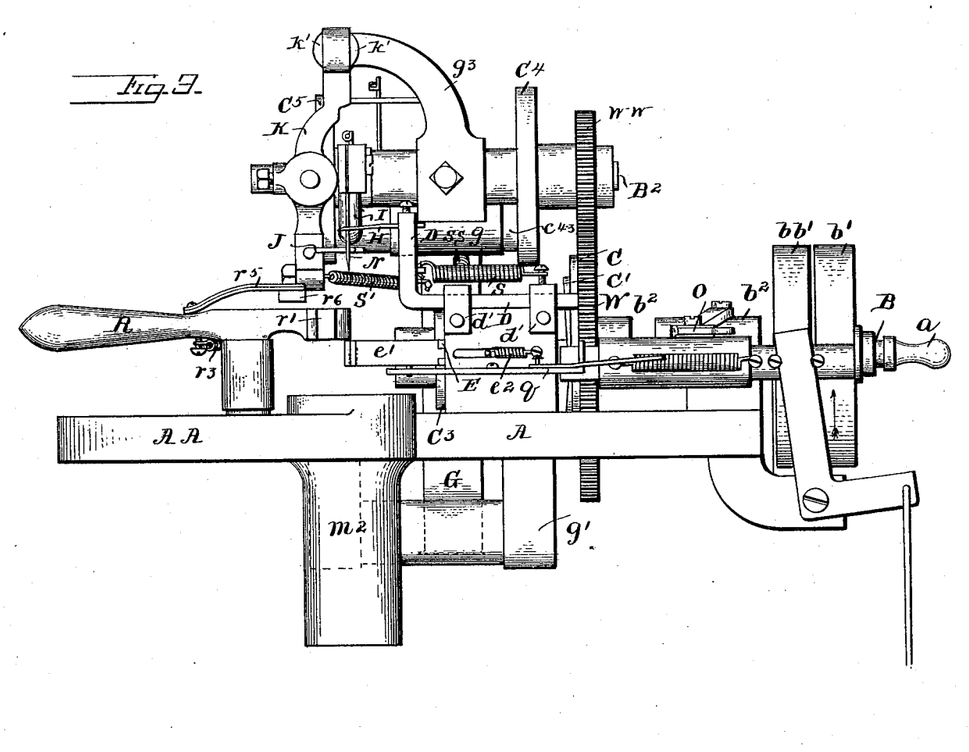
Fig. 7, Sheet 6, a plan view of cylinder-bed and cylinders, partly in section, with lever-retaining dog.
Figure 8:
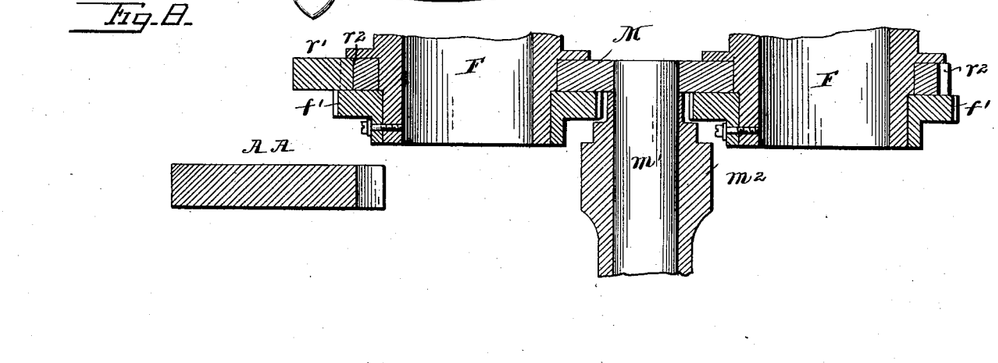
Fig. 8, a section on line 4 4, Fig. 7.

Hollow cylinders with impaling-points have been long used prior to my invention in machines for looping together two parts of a circular-knit fabric, and the ordinary latch-needle cylinders with the needles therein used as impaling-points have been employed for a similar purpose. Heretofore, however, these cylinders thus used have been detachable, so that as soon as the knit fabrics impaled on one cylinder have been united by the looping or knitting machine the cylinder was detached from its bed or support in the machine and another with the fabrics impaled thereon substituted, in order that the machine might be kept as nearly as could be in continuous operation. There are, however, certain objections to the employment of such detachable cylinders, as, for instance, when not in use—that is, not in place or connected with the looping-machine—they were liable to become misplaced, broken, or distorted and to become injuriously worn (as well as the attaching devices) from being frequently removed and replaced. Besides, loss of time—considerable in the aggregate—occurred in making these changes. To obviate these defects, I have devised a construction which is shown in several figures of the accompanying drawings. This consists in mounting two cylinders F F' (which need not be detachable except for purposes of repair or substitution in case of breakage) upon a bed M, adapted to be shifted in a manner to bring one of the cylinders F, on which the fabrics have been impaled, into proper position relative to the looping-needle, while the other cylinder F' is in convenient position for the operator to impale the fabrics thereon to be united during the working of the looping mechanism. The particular construction of this feature of my invention, which I have found to be the most desirable, consists of an elongated arm or bed M, that is pivoted by a vertical shaft or stud $m'$, entered into a bearing $m^2$, extending from below an arm AA, secured to or forming an integral part of the frame that supports the looping mechanism. The arrangement is such, as shown, that the bed may be rotated on its bearing, so as to bring one of the equidistant cylinders, say F, into proper position for the looping-needle and for the action of the mechanism for rotating the cylinder on its axis, while the other or outer cylinder F' is next to the operator, as seen in Figs. 1 and 2. This cylinder-carrying bed should, of course, be capable of being locked to maintain the, so to say, active cylinder in proper position. To this end I employ a device for locking the bed automatically, but permitting the ready unlocking thereof. This consists of a hand-lever R, the inner arm of which ends in a projection $r'$, which is adapted to engage a notch $r^2$ in the edge of the cylinder-bed, in which notch it is held by the stress of a spring $r^3$, one end of which is attached to a vertical pin $r^4$ on the arm and the other end to the handle part of the lever. A spring $r^5$, having one end secured to the lever and having a friction-pad $r^6$ on the inner side of its free end bears upon a rim $r^7$ of the cylinder. The purpose of this padded spring is to prevent, by friction, the cylinder from being rotated by momentum beyond the predetermined required distance by the action of the pawl and ratchet and cam mechanism hereinbefore described. Other means for accomplishing the same result may be employed. In fact the device may sometimes be dispensed with, at some disadvantage, however. The ends of the bed are rounded, as shown, so that they may not strike any part of the looping mechanism as it (the bed) is rotated on its axis.

When it is necessary to rotate the bed when the fabrics on one cylinder have been united, the operator pulls the handle of the lever and thereby disengages the projection $r'$ from the notch $r^2$. At the same time the movement of the handle carries the free or padded end of the spring out of contact with the rim, and thus takes off the pressure. When the bed is swung round to reverse the positions of the cylinders thereon, the lever is forced back by the rounded end of the bed impinging against the projection $r'$, which latter finally drops into the notch $r^2$ and so automatically locks the bed in place.

I do not limit myself to the precise constructions hereinbefore described and as shown in the drawings, more especially with regard to the mechanism or devices for effecting the peculiar looped connection of the parts of such fabrics, as the result may be attained by means of other devices without departing from the essential principle of the invention.

Having thus described my invention, I claim as new and desire to secure by Letters Patent—

1. In a machine of the class described, the combination of a series of impaling-points secured to a common bed or support, mechanism for imparting to said support a step-by-step movement, a vibrating thread-carrying needle arranged to pass through the loops of parts of fabrics impaled on the said points and also to make an intermediate vibration between each two adjacent points, means, including a looper, coöperating with said needle to form a stitch upon each vibration thereof, and means independent of said needle and looper and operating intermittently to engage and hold distended certain of the loops formed by said needle and looper, whereby the stitches formed intermediately of the said points are formed with slack or spare thread, and the stitches through the impaled loops are made tight substantially as specified.

2. In a machine of the class recited, the combination of the cylinder provided with impaling-points, means for imparting a step-by-step movement to said cylinder, the needle-carrying bar and needle, means for vibrating said needle-bar and needle with relation to the impaling-points and for moving said bar whereby alternate vibrations are made in paths unequally distant from the axis of the said cylinder, the horn and means for actuating the same at the described intervals, and a vibratory device arranged to coöperate with the said needle and horn in forming the stitch, substantially as and for the purposes specified.

3. In a machine of the class recited, the combination of the driving-shaft, the gear W and cams as C, C', and $C^3$, thereon, the horn and its bar adapted to be actuated by cam, C, the pawl-carrying bar, E, adapted to be actuated by cam, C', the pivoted arm, G, adapted to be actuated by cam, $C^3$, means for holding said arm in contact with the said cam $C^3$, the shaft, $B^2$, journaled in said arm, the pinion on said shaft, the shaft, $B^3$, journaled in arm, G, the needle-carrying bar thereon, the mechanism for actuating said shaft $B^3$ to impart an up-and-down vibratory movement of the needle-bar, the bifurcated hook, J, and mechanism for actuating the same, together with the cylinder provided with the impaling-points and teeth adapted to be engaged by the pawl of said bar, E, the construction, arrangement and mode of operation of the parts being such as shown and described, whereby the parts of a fabric impaled upon the cylinder are united by series of alternate tight and loose stitches.

4. In a machine of the class described, the combination with a rotary cylinder upon which the work is adapted to be supported, and the bed or support therefor, of the pivoted-lever dog arranged to engage and lock the said support, and having a friction-arm arranged to contact with the said cylinder, substantially as specified.

5. In a machine for the purpose described, the combination of a main shaft, its cams C, C' and $C^3$, the horn-actuating device operated by said cam C', the horn, the pawl-carrying slide and pawl operated by the cam C', the pivoted arm G operated by a to-and-fro movement of the cam $C^3$, the needle-arm, its needle, the shaft $B^2$ geared to the main shaft, the cam-disk $C^4$ on said shaft $B^2$ and arranged to vibrate said needle-arm vertically, the cam-wheel $C^5$ also carried by the said shaft $B^2$, the hook-carrying arm having a shoe which engages the wheel, and the hook, together with one or more cylinders arranged to be rotated in turn by the said pawl, substantially as specified.

6. In a machine for the purpose described, the combination of the main shaft, a cylinder, means for rotating said cylinder, the horn, and means for advancing and retracting the same, the pivoted arm G, means for vibrating said arm and for moving it toward and away from the said cylinder, the needle-arm, its needle, and the bifurcated hook, together with means for advancing said hook toward and away from the needle in a plane at right angles to the plane of its vibration, and for moving it toward and away from the cylinder, substantially as specified.

In testimony whereof I have hereunto affixed my signature in the presence of two subscribing witnesses.

JOHN G. POWELL.

Witnesses:
   GEO. W. REED,
   THOS. J. REED.